United States Patent
Bean

(10) Patent No.: US 11,573,331 B1
(45) Date of Patent: Feb. 7, 2023

(54) SYSTEMS AND METHODS FOR SCALABLE GNSS ACQUISITION AND TRACKING

(71) Applicant: Rockwell Collins, Inc., Cedar Rapids, IA (US)

(72) Inventor: Reginald D. Bean, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1 day.

(21) Appl. No.: 17/124,038

(22) Filed: Dec. 16, 2020

Related U.S. Application Data

(62) Division of application No. 15/722,935, filed on Oct. 2, 2017, now Pat. No. 10,895,645.

(51) Int. Cl.
*G01S 19/24* (2010.01)
*G01S 19/34* (2010.01)

(52) U.S. Cl.
CPC .............. *G01S 19/24* (2013.01); *G01S 19/34* (2013.01)

(58) Field of Classification Search
CPC .................................. G01S 19/24; G01S 19/34
USPC ............ 342/357.63, 357.24, 357.29; 368/47; 712/28
See application file for complete search history.

(56) References Cited

U.S. PATENT DOCUMENTS

| | | | |
|---|---|---|---|
| 7,538,726 B1* | 5/2009 | Tester | G01S 19/46 342/357.29 |
| 3,193,981 A1 | 6/2012 | Hwang et al. | |
| 8,279,910 B2 | 10/2012 | Grover et al. | |
| 8,432,771 B2* | 4/2013 | Matsuzaki | G04G 21/02 368/47 |
| 9,702,979 B1* | 7/2017 | Joseph | G01S 19/46 |
| 2005/0223191 A1* | 10/2005 | Ferris | G06F 30/30 712/28 |

* cited by examiner

*Primary Examiner* — Bo Fan
(74) *Attorney, Agent, or Firm* — Suiter Swantz pc llo

(57) ABSTRACT

A receiver device includes an acquisition engine and a reconfiguration engine. The acquisition engine uses a first circuit size. The acquisition engine is configured to receive a first signal including a plurality of first satellite vehicle signals, and identify a first satellite vehicle based on the first signal. The reconfiguration engine is configured to receive an indication that the acquisition engine identified the first satellite vehicle, and responsive to receiving the indication, generate a reconfiguration file defining a second circuit size less than the first circuit size. The reconfiguration engine is configured to cause the acquisition engine to be reconfigured based on the reconfiguration file to use the second circuit size.

8 Claims, 6 Drawing Sheets

US 11,573,331 B1

SYSTEMS AND METHODS FOR SCALABLE GNSS ACQUISITION AND TRACKING

CROSS REFERENCE TO RELATED APPLICATIONS

The present application is related to and claims benefit of the earliest available effective filing date from the following application. The present application constitutes a divisional patent application of U.S. patent application Ser. No. 15/722,935, entitled SYSTEMS AND METHODS FOR SCALABLE GNSS ACQUISITION AND TRACKING, naming Reginald D. Bean as inventor, filed Oct. 2, 2017. U.S. patent application Ser. No. 15/722,935 is incorporated by reference herein in its entirety.

BACKGROUND

The inventive concepts disclosed herein relate generally to the field of navigation systems. More particularly, embodiments of the inventive concepts disclosed herein relate to systems and methods for scalable GNSS acquisition and tracking.

In existing satellite receivers, such as for acquiring and tracking signals from a global navigation satellite system (GNSS) satellite vehicle, when a GNSS receiver starts up or loses track of satellite vehicles, it must attempt to acquire satellites. Because of the significant computational load needed to successfully perform acquisition, existing GNSS receivers may allocate a significant amount of computational resources to performing the acquisition. However, this allocation may result in wasted resources after acquisition is completed; for example, in a field programmable gate array (FPGA) implementation, the hardware resources allocated to acquisition may be idling and continuing to use power even after acquisition is completed.

SUMMARY

In one aspect, the inventive concepts disclosed herein are directed to a receiver device. The receiver device includes an acquisition engine and a reconfiguration engine. The acquisition engine uses a first circuit size. The acquisition engine is configured to receive a first signal including a plurality of first satellite vehicle signals, and identify a first satellite vehicle based on the first signal. The reconfiguration engine is configured to receive an indication that the acquisition engine identified the first satellite vehicle, and responsive to receiving the indication, generate a reconfiguration file defining a second circuit size less than the first circuit size. The reconfiguration engine is configured to cause the acquisition engine to be reconfigured based on the reconfiguration file to use the second circuit size.

In a further aspect, the inventive concepts disclosed herein are directed to an airborne platform. The airborne platform includes a satellite receiver associated with an antenna. The antenna is configured to receive a first radio frequency signal including a plurality of first satellite vehicle signals and configured to generate a first data signal based on the first radio frequency signal. The satellite receiver includes an FPGA configured to identify, by an acquisition engine of the FPGA, a first satellite vehicle based on the first data signal. The FPGA is configured to generate, responsive to identifying the first satellite vehicle, a reconfiguration file defining a second circuit size less than the first circuit size. The FPGA is configured to execute partial reconfiguration of the FPGA to reconfigure the acquisition engine to use the second circuit size based on the reconfiguration file.

In a further aspect, the inventive concepts disclosed herein are directed to a method. The method includes receiving, at an acquisition engine using a first circuit size, a first signal including a plurality of first satellite vehicle signals. The method includes identifying, by the acquisition engine, a first satellite vehicle based on the first signal. The method includes receiving, at a reconfiguration engine, an indication that the acquisition engine identified the first vehicle. The method includes generating, at the reconfiguration engine, responsive to receiving the indication, a reconfiguration file defining a second circuit size less than the first circuit size. The method includes reconfiguring the acquisition engine to use the second circuit size based on the reconfiguration file.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
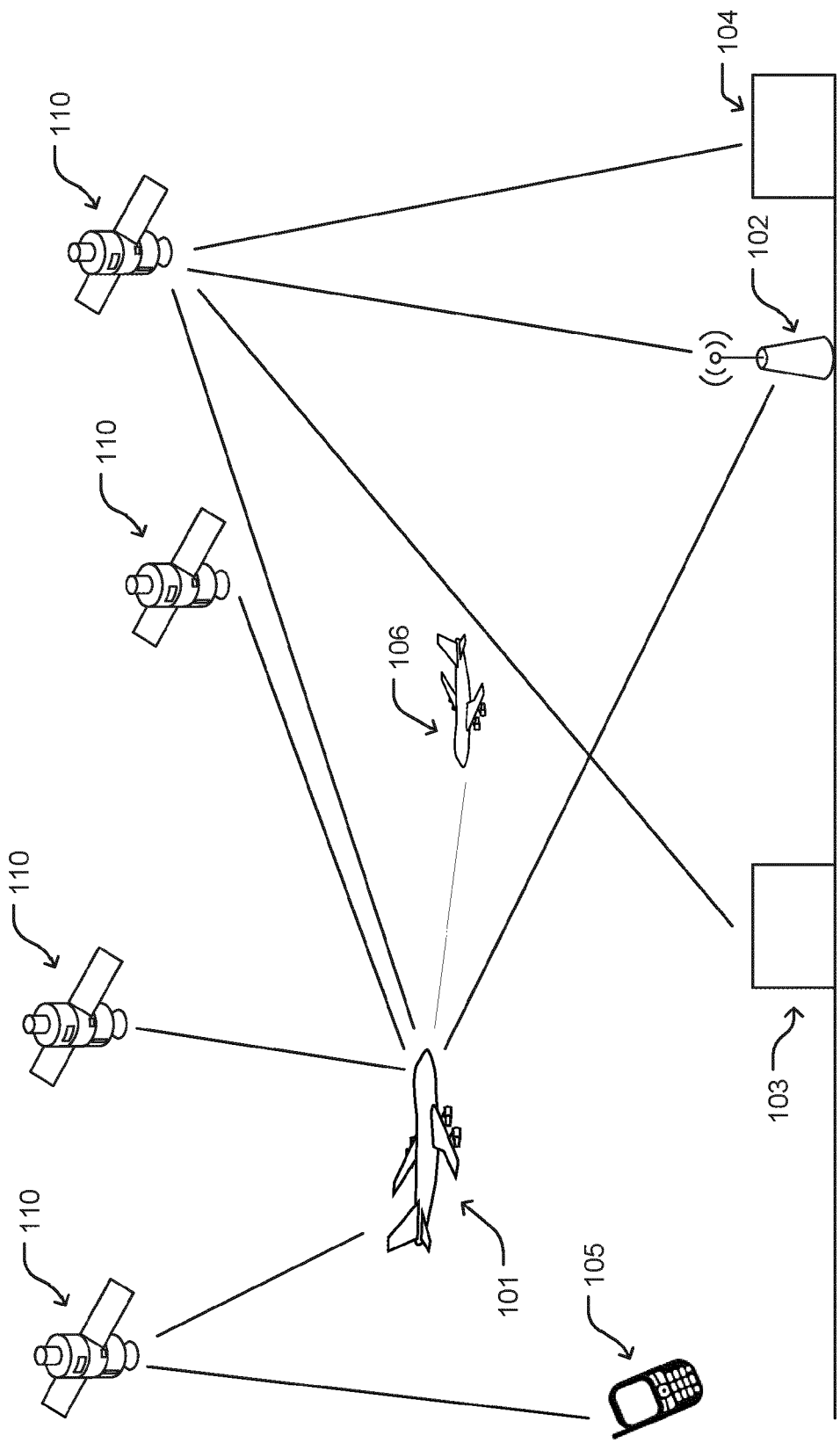
FIG. 1 is a schematic diagram of an exemplary embodiment of a communication network for communication with GNSS satellite vehicles according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for scalable global navigation and satellite system (GNSS) acquisition and tracking. The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the present disclosure describes systems and methods implementable for a platform, the inventive concepts disclosed herein may be used in any type of environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system, a portable electronic device, a hand-held location tracking device).

In some embodiments, a receiver device includes an acquisition engine and a reconfiguration engine. The acquisition engine uses a first circuit size. The acquisition engine is configured to receive a first signal including a plurality of first satellite vehicle signals, and identify a first satellite vehicle based on the first signal. The reconfiguration engine is configured to receive an indication that the acquisition engine identified the first satellite vehicle, and responsive to receiving the indication, generate a reconfiguration file defining a second circuit size less than the first circuit size. The reconfiguration engine is configured to cause the acquisition engine to be reconfigured based on the reconfiguration file to use the second circuit size.

The receiver device can be integrated with an airborne platform or other platform as described herein. For example, the FPGA reconfiguration based on GNSS acquisition described herein can be associated with avionics controllers or other critical electronic devices, such as those in an aircraft cockpit or control center, of the airborne platform. The receiver device can also be integrated with a portable electronic device.

Systems manufactured in accordance with the inventive concepts disclosed herein can improve the operation of GNSS receiver hardware, as well as portable electronic devices, or aircraft or other airborne platforms, including GNSS receiver hardware, by reducing the size, computational resources, and/or power needed to operate the GNSS receiver hardware. For example, a receiver device according to the inventive concepts disclosed herein can improve the performance of FPGA-based GNSS receiver hardware to be similar to or better than existing application specific integrated circuit (ASIC) hardware, allowing for the benefits of FPGA design, manufacturing, and implementation processes, as compared to ASIC hardware, to be used for GNSS acquisition and tracking. This may include improving the performance of FPGA-based GNSS receiver hardware to more efficiently execute acquisition computations by reducing the number of logical elements used for acquisition calculations after a first satellite signal is acquired, which may increase the speed of the FPGA-based GNSS receiver hardware to be similar to or greater than existing ASIC-based GNSS receiver hardware (e.g., by more efficiently allocating computational resources to both acquisition/tracking computations as well as other computations which may need to be executed by the GNSS receiver hardware).

Referring now to FIG. 1, a communication network 100 is shown according to an exemplary embodiment of the inventive concepts disclosed herein. The communication network 100 includes various platforms (e.g., airborne platforms, ground-based platforms, mobile platforms, stationary platforms, handheld devices, maritime platforms, portable electronic devices) which may be configured to communicate with one or more satellite vehicles 110. As shown in FIG. 1, the communication network may include platforms such as an airborne platform 101, a ground-based (e.g., stationary) platform 102, a mobile ground platform 103, a maritime platform 104, and/or a portable electronic device 105 (e.g., handheld device). It will be appreciated that various other communications devices may be included in the network so as to communicate with the one or more satellite vehicles 110. The platforms can be configured to transmit/receive (e.g., via one or more receiver/transmitter/transceiver hardware devices) radio frequency signals to/from various remote sources. The platforms can receive radio frequency signals (e.g., GNSS signals) from one or more satellite vehicles 110 along various lines of sight. The platforms can receive radio frequency signals from other platforms; for example, as shown in FIG. 1, the airborne platform 101 is configured to receive radio frequency signals from remote sources, such as the ground-based platform 102 and from one or more remote airborne platforms 106. The lines of sight to the various remote sources may overlap. As the platforms (e.g., airborne platform 101) change in position and/or orientation relative to the remote sources, the platforms may lose or have to reset tracking of the radio frequency signals. Radio frequency signals may be reflected of various platforms or the ground, complicating tracking of the remote sources. Similarly, in a multi-path environment (not shown), such as an urban environment for communication with portable electronic devices, each radio frequency signal may be received by the platforms along two or more paths. Various such issues may increase the complexity of acquiring and tracking radio frequency signal sources, such as satellite vehicles 110, and thus increase the computational resources required to effectively execute acquisition and tracking.

Figure 2:
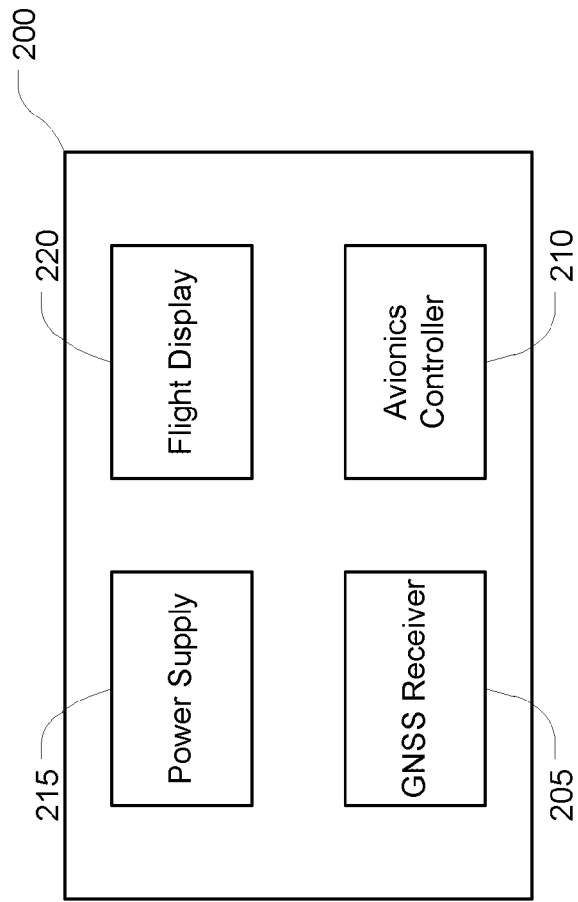
FIG. 2 is a block diagram of an exemplary embodiment of a system for GNSS acquisition and tracking according to the inventive concepts disclosed herein.
Figure 2:
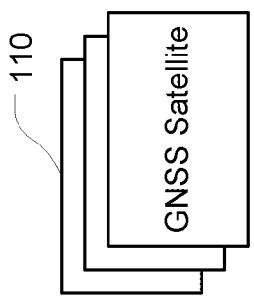

Referring now to FIG. 2, a block diagram of a system 200 is shown accordingly to an exemplary embodiment of the inventive concepts disclosed herein. Briefly, the system 200 can be configured to acquire and track one or more satellite vehicles 110 (e.g., GNSS satellite vehicles), such as for determining the location of the system 200 or a platform or electronic device associated with the system 200. The system 200 can include a GNSS receiver 205, an avionics controller 210, a power supply 215 (e.g., an aircraft power supply), and a flight display 220. While FIG. 2 illustrates the system 200 as being implemented in an airborne platform, as noted above, the inventive concepts disclosed herein may be implemented in various platforms including ground-based platforms or portable electronic devices; for example, the avionics controller 210 in various embodiments may be configured as a controller specific to the platform implementing the system 200.

One or more components of the system 200 (e.g., GNSS receiver 205, avionics controller 210) may include a processing circuit. The processing circuit (e.g., control circuits, processing electronics) can include a processor and memory. The processor may be implemented as a specific purpose processor, an application specific integrated circuit (ASIC), one or more field programmable gate arrays (FPGAs), a group of processing components, or other suitable electronic processing components. The memory is one or more devices (e.g., RAM, ROM, flash memory, hard disk storage) for storing data and computer code for completing and facilitating the various user or client processes, layers, and modules described in the present disclosure. The memory may be or include volatile memory or non-volatile memory and may include database components, object code components, script components, or any other type of information structure for supporting the various activities and information structures of the inventive concepts disclosed herein. The memory is communicably connected to the processor and includes computer code or instruction modules for executing one or more processes described herein. The memory includes various circuits, software engines, and/or modules that cause the processor to execute the systems and methods described herein.

In some embodiments, the GNSS receiver 205 is configured to receive signals from the one or more satellite vehicles 110. The GNSS receiver 205 can include an antenna configured to receive radio frequency signals. The GNSS receiver 205 can be configured to execute computational processes on the received radio frequency signals, including determining a location associated with the GNSS receiver 205 based on processing one or more received radio frequency signals. The GNSS receiver 205 can be configured to generate and output position data.

The avionics controller 210 can be configured to control various components of the airborne platform, such as engine control functions, navigation functions, or flight control surface control functions. The avionics controller 210 can be configured to receive the position data from the GNSS receiver 205 and cause the flight display 220 to display information based on the position data. As noted above, in various embodiments, the system 200 may include a controller specific to the platform on which the system 200 is being implemented.

The power supply 215 can be configured to provide electrical power to various components of the system 200, including the GNSS receiver 205, avionics controller 210, and flight display 220. In some embodiments, the power supply 215 can provide electrical power to various components of a platform implementing the system 200 (e.g., an aircraft power supply which provides power to various aircraft electronics). The power supply 215 can include an energy storage device (e.g., battery). The power supply 215 can include a generator configured to generate electricity based on kinetic energy from engines or other components of the platform. The power supply 215 can include an electrical power network configured to transmit electricity (e.g., as demanded by the GNSS receiver 205 or other components).

The flight display 220 can include one or more displays. The flight display 220 can be provided in an aircraft cockpit or control center, such as for display to a pilot and/or co-pilot. The flight display 220 can be configured to display flight critical information. The flight display 220 can be configured to display information based on position data received from the GNSS receiver 205, such as to display a position of the airborne platform, as well as a flight plan map which may be displayed along with the position of the airborne platform.

Figure 3A:
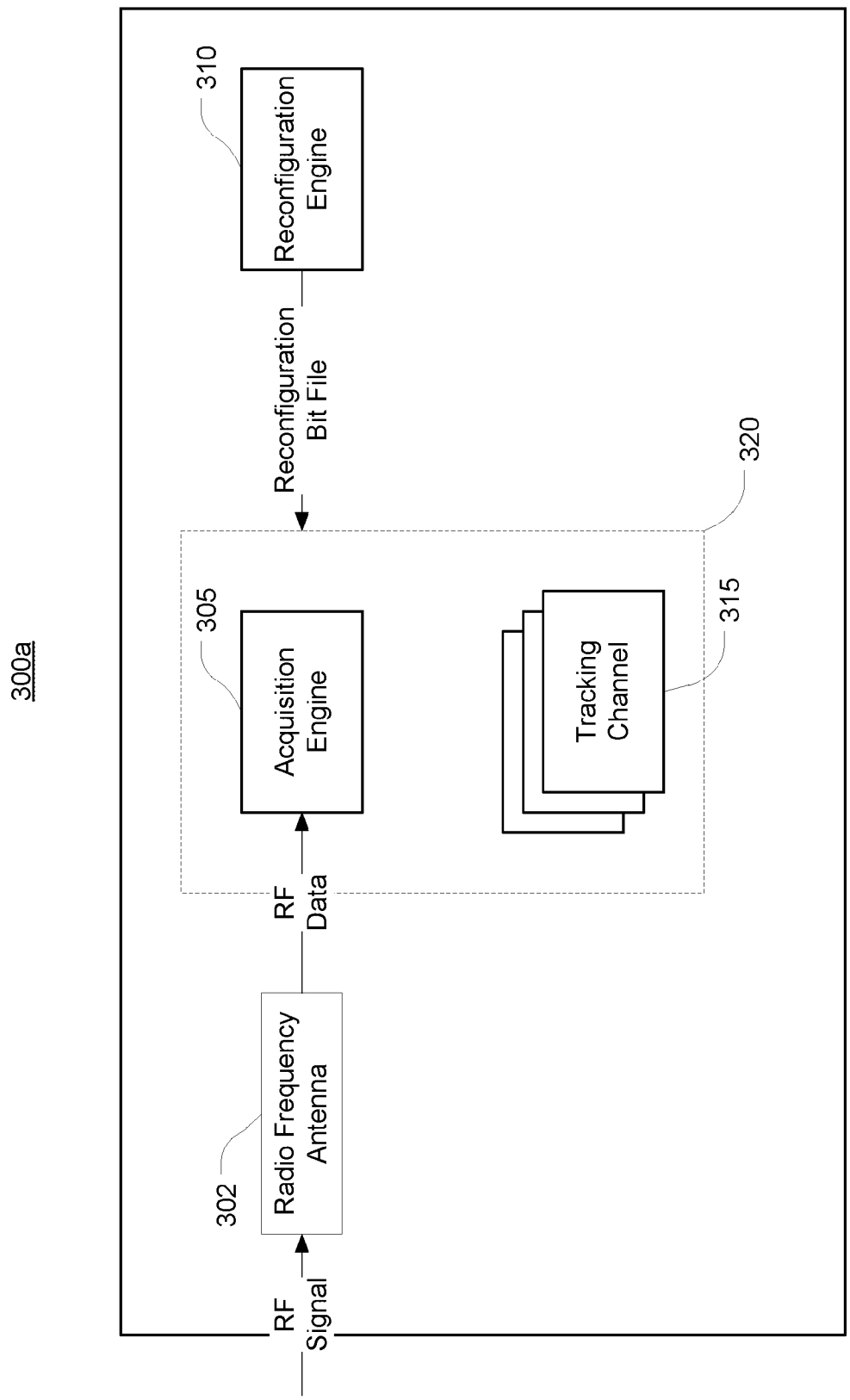
FIG. 3A is a block diagram of a receiver device for GNSS acquisition and tracking configured to execute FPGA partial reconfiguration according to the inventive concepts disclosed herein.

Referring now to FIG. 3A, a block diagram of a receiver device 300a is shown according to an exemplary embodiment of the inventive concepts disclosed herein. The receiver device 300a can be implemented as part and/or incorporate features of the GNSS receiver 205 described with reference to FIG. 2. In brief overview, the receiver device 300a can include a radio frequency antenna 302, an acquisition engine 305, a reconfiguration engine 310, and one or more tracking channels 315.

The radio frequency antenna 302 is configured to receive a radio frequency signal. The radio frequency signal can include a plurality of satellite vehicle signals. For example, the radio frequency signal can include signals transmitted from a plurality of the satellite vehicles 110 as illustrated in FIG. 1. Due to the multiple satellite vehicle signals and other complicating factors described above, the radio frequency signal may be relatively noisy, making it difficult for the receiver device 300a (e.g., acquisition engine 305) to accurately acquire each satellite vehicle 110.

The radio frequency antenna 302 can generate radio frequency data (e.g., an electrical or optical signal encoding the radio frequency data) based on the radio frequency signal. The radio frequency antenna 302 can transmit the radio frequency data to the acquisition engine 305. The radio frequency data can include (e.g., encode) signals from one or more satellite vehicles 110.

The acquisition engine 305 is configured to acquire GNSS signal(s) (e.g., from satellite vehicle(s) 110). The acquisition engine 305 can acquire GNSS signals based on the radio frequency data (e.g., the electrical signal encoding the radio frequency data). In some embodiments, acquiring the GNSS signals includes identifying a first satellite vehicle 110 based on the radio frequency data. In some embodiments, acquiring the GNSS signals includes detecting GNSS signals from a particular satellite vehicle 110.

The acquisition engine 305 can be configured to acquire GNSS signals based on a time uncertainty parameter. The time uncertainty parameter may indicate or correspond to a duration of radio frequency data to be searched for acquiring the GNSS signals. For example, acquiring the GNSS signal associated with a first satellite vehicle 110 may be associated with a relatively large time uncertainty parameter. In some embodiments, the time uncertainty parameter is on the order of milliseconds. In some embodiments, the acquisition engine 305 is configure to acquire GNSS signals based on correlating a sample signal to the received radio frequency data. For example, the acquisition engine 305 can execute an integration of the sample signal and the received radio frequency data to determine a power, and search for a power peak or other indication of signal match to acquire the GNSS signal(s) (e.g., from a particular satellite vehicle 110). The acquisition engine 305 can be configured to output a result signal indicating acquisition of the GNSS signals (e.g., acquisition of GNSS signal from first satellite vehicle 110; acquisition of GNSS signal from subsequent satellite vehicle(s) 110). It will be appreciated that computational resources needed to accurately execute acquisition will increase as a function of the time uncertainty parameter, such that a greater number of processing elements and/or a greater amount of time may be required to execute the acquisition if the time uncertainty parameter is relatively large.

In some embodiments, regulatory requirements or other requirements for operation of the acquisition engine 305 may include a sample rate requirement. For example, the receiver device 300a may be required to output position data at a minimum rate, or the receiver device 300a may be required to acquire GNSS signals within a threshold time (e.g., the receiver device 300a may be required to re-acquire GNSS signals within a threshold time after the receiver device 300a starts up or has lost track of one or more satellite vehicles 110). As such, operation of the receiver device 300a may be improved if the computational resources used for executing acquisition can be reduced, such as by reducing the processing hardware required to execute acquisition and/or reducing the time required to execute acquisition.

In some embodiments, the receiver device 300a includes a field programmable gate array (FPGA) 320. The FPGA 320 can include a plurality of logic elements (e.g., configurable logic blocks), which can be configured and/or reconfigured into various processing circuits based on processing needs of the receiver device 300a. The FPGA 320 can be configured to implement the acquisition engine 305, such as by allocating logic elements for execution of the acquisition engine 305. In some embodiments, the FPGA 320 includes logic elements (or equivalents thereof) on the order of millions. The logic elements may be logical hardware elements (e.g., electronic hardware switches configured to generate an output based on executing a logical operation on one or more inputs).

In some embodiments, the acquisition engine 305 uses a first circuit size (e.g., uses electronic components of the FPGA 320 corresponding to a first circuit size). The first circuit size may correspond to a number of logical hardware elements used to execute the acquisition engine 305 and/or the functions performed by the acquisition engine 305. For example, the first circuit size may be on the order of 500,000 logical hardware elements.

In some embodiments, the first circuit size corresponds to a first value of the time uncertainty parameter for acquiring the GNSS signal from the first satellite vehicle 110. As will be described herein, the acquisition engine 305 can be reconfigured to use a smaller circuit size as the time uncertainty parameter decreases in value.

In some embodiments, the acquisition engine 305 receives a first amount of electrical power. The first amount of electrical power may be received while executing the functions of the acquisition engine 305. The first amount of electrical power may be received from a power supply (e.g., power supply 215). The first amount of electrical power may be a function of the first circuit size (e.g., proportional to the first circuit size; corresponding to a function in which the first amount of electrical power increases as the first circuit size decreases).

The reconfiguration engine 310 is configured to receive an indication that the acquisition engine 305 acquired (e.g., identified, detected GNSS signals from) the first satellite vehicle 110. For example, the reconfiguration engine 310 can receive the result signal indicating that the acquisition engine 305 acquired the GNSS signals from the first satellite vehicle 110.

The reconfiguration engine 310 is configured to generate a reconfiguration file. The reconfiguration engine 310 can generate the reconfiguration file in response to receiving the indication. The reconfiguration file can be a partial bit file. The reconfiguration engine 310 can transmit the reconfiguration file to the FPGA 320. The reconfiguration engine 310 can use the reconfiguration file to configure various aspects of the FPGA 320, including the acquisition engine 305 and the tracking channels 315.

The reconfiguration file can define a second circuit size less than the first circuit size. Like the first circuit size, the second circuit size can correspond to a number of logical hardware elements used to execute the acquisition engine 305 and/or the functions performed by the acquisition engine 305. As such, when using the second circuit size, the acquisition engine 305 can use fewer computational resources than when using the first circuit size. In some embodiments, the acquisition engine 305 receives a second amount of electrical power which is less than the first amount of first electrical power when using the second circuit size, such that the power demand of the acquisition engine 305 decreases as the used circuit size decreases.

In some embodiments, the reconfiguration engine 310 is configured to define the second circuit size based on a second value of the time uncertainty parameter. The second value can be determined based on an expected demand for computational resources subsequent to acquisition of the GNSS signals from the first satellite vehicle 110. For example, the reconfiguration engine 310 can be configured to execute a resource allocation function to determine the expected demand for computational resources. The resource allocation function can receive one or more of the first value of the time uncertainty parameter, a characteristic of the GNSS signals from the first satellite vehicle 110 (e.g., distance to the first satellite vehicle 110; one or more of bandwidth, signal strength, complexity, or data rate of the GNSS signals from the first satellite vehicle 110) as inputs for determining the expected demand for computational resources. The second circuit size can be greater than a threshold circuit size for acquiring GNSS signals from any satellite vehicle 110 (e.g., from a last satellite vehicle 110 among a plurality of satellite vehicles 110). The reconfiguration engine 310 may include a lookup table associating a number of satellite vehicles 110 (e.g., a total number of satellite vehicles 110 and/or a number of acquired satellite vehicles 110) with the second circuit size.

In some embodiments, the reconfiguration engine 310 is configured to cause the FPGA 320 to execute partial FPGA reconfiguration based on the reconfiguration file. For example, the FPGA 320 can deallocate computational resources (e.g., logical elements) previously allocated to the acquisition engine 305 as part of the first circuit size to reduce the computational resources used by the acquisition engine 305 from the first circuit size to the second circuit size. In some embodiments, executing the partial FPGA reconfiguration includes continuing to execute functions on other logical elements (e.g., a static region, operational tracking channels 315 as will be described herein) of the FPGA 320 while deallocating the computational resources previously allocated to the acquisition engine 305.

The acquisition engine 305 can use the second circuit size to acquire a second GNSS signal from a second satellite vehicle 110. For example, the acquisition engine 305 can receive a second radio frequency signal including a plurality of second satellite vehicle signals, and identify a second satellite vehicle based on the second radio frequency signal. It will be appreciated that there may be overlap between the second radio frequency signal and the first radio frequency signal used to acquire the first satellite vehicle 110. For example, the plurality of second satellite vehicles of the second radio frequency signal may include at least one of the plurality of first satellite vehicle signals. The acquisition engine 305 can continue to acquire subsequent GNSS signals from additional satellite vehicles 110; each time a signal is acquired, the reconfiguration engine 310 can cause the FPGA 320 to execute partial reconfiguration to reduce the circuit size used by the acquisition engine 305.

In some embodiments, the receiver device 300a is configured to reduce power usage by logical elements used with the first circuit size and not used with the second circuit size. For example, by executing partial reconfiguration of the FPGA 320, which may include deallocating logical elements used by the acquisition engine 305, the receiver device 300a can be configured to request less power from a power supply (e.g., power supply 215) for operation of the FPGA 320. The logical elements used with the first circuit size and not used with the second circuit size may be configured to use a minimum amount of power which is less than an acquisition amount of power used for execution of the acquisition engine 305 or a tracking amount of power used for execution of the tracking channel 315. As compared to existing systems, in which an acquisition engine of an FPGA would continue to use power even when not executing acquisition functions, the inventive concepts disclosed herein can reduce power usage (e.g., based on reduced computational resource usage) in a manner commensurate with the need for performing acquisition, such as in a manner corresponding to the time uncertainty parameter for acquisition.

The one or more tracking channels 315 are configured to track satellite vehicles 110 (e.g., track GNSS signals from satellite vehicles 110). The one or more tracking channels 315 can be initiated based on instructions from the acquisition engine 305 (e.g., responsive to the acquisition engine 305 acquiring GNSS signals). For example, the acquisition engine 305 can acquire a first GNSS signal from a first satellite vehicle 110 and initiate a first tracking channel 315 based on acquiring the first GNSS signal.

The first tracking channel 315 (as well as subsequent tracking channels 315) may be generated based on partial reconfiguration of the FPGA 320. For example, the reconfiguration engine 310 can define the reconfiguration file to include a third circuit size for use by the first tracking channel 315. In some embodiments, at least a portion of the third circuit size (e.g., logical elements of the third circuit size) is allocated from a portion of the first circuit size not used with the second circuit size (e.g., logical elements deallocated from the first circuit size for the acquisition engine 305 can be reallocated to the third circuit size for executing the tracking channel 315).

In some embodiments, the one or more tracking channels 315 are associated with a tracking time uncertainty parameter. The tracking time uncertainty parameter may be on the order of nanoseconds. As such, the computational resources required by each tracking channel 315 may be significantly less than for the acquisition engine 305 (particularly for the acquisition engine 305 to acquire the first satellite vehicle 110). The reconfiguration engine 310 can define the reconfiguration file to define the third circuit size based on the tracking time uncertainty parameter in a similar manner as for defining the first or second circuit size based on the respective values of the time uncertainty parameter for the acquisition engine 305. In some embodiments, the reconfiguration engine 310 is configured to initialize each tracking channel 315 responsive to acquisition of the corresponding GNSS signal(s) from the satellite vehicles 110 by the acquisition engine 305. For example, the reconfiguration engine 310 can receive a first indication that the acquisition engine 305 has acquired the first GNSS signal from the first satellite vehicle 110, and in response, generate and transmit to the FPGA 320 a first reconfiguration file configured to cause partial reconfiguration of the FPGA 320 including reducing the circuit size used by the acquisition engine 305 and initiating the first tracking channel 315; receive a second indication that the acquisition engine 305 has acquired the second GNSS signal from the second satellite vehicle 110, and in response, generate and transmit to the FPGA 320 a first reconfiguration file configured to cause partial reconfiguration of the FPGA 320, which may include reducing the circuit size used by the acquisition engine 305, and includes initiating the second tracking channel 315, and so on as needed for additional acquisitions to be executed by the acquisition engine 305 and for corresponding tracking channels 315.

In some embodiments, such as shown in FIG. 3A, the reconfiguration engine 310 can be separate from or external to the FPGA 320. For example, the reconfiguration engine 310 can be implemented on a memory device separate from the FPGA 320. The reconfiguration engine 310 can be implemented on a flash-based memory device.

Figure 3B:
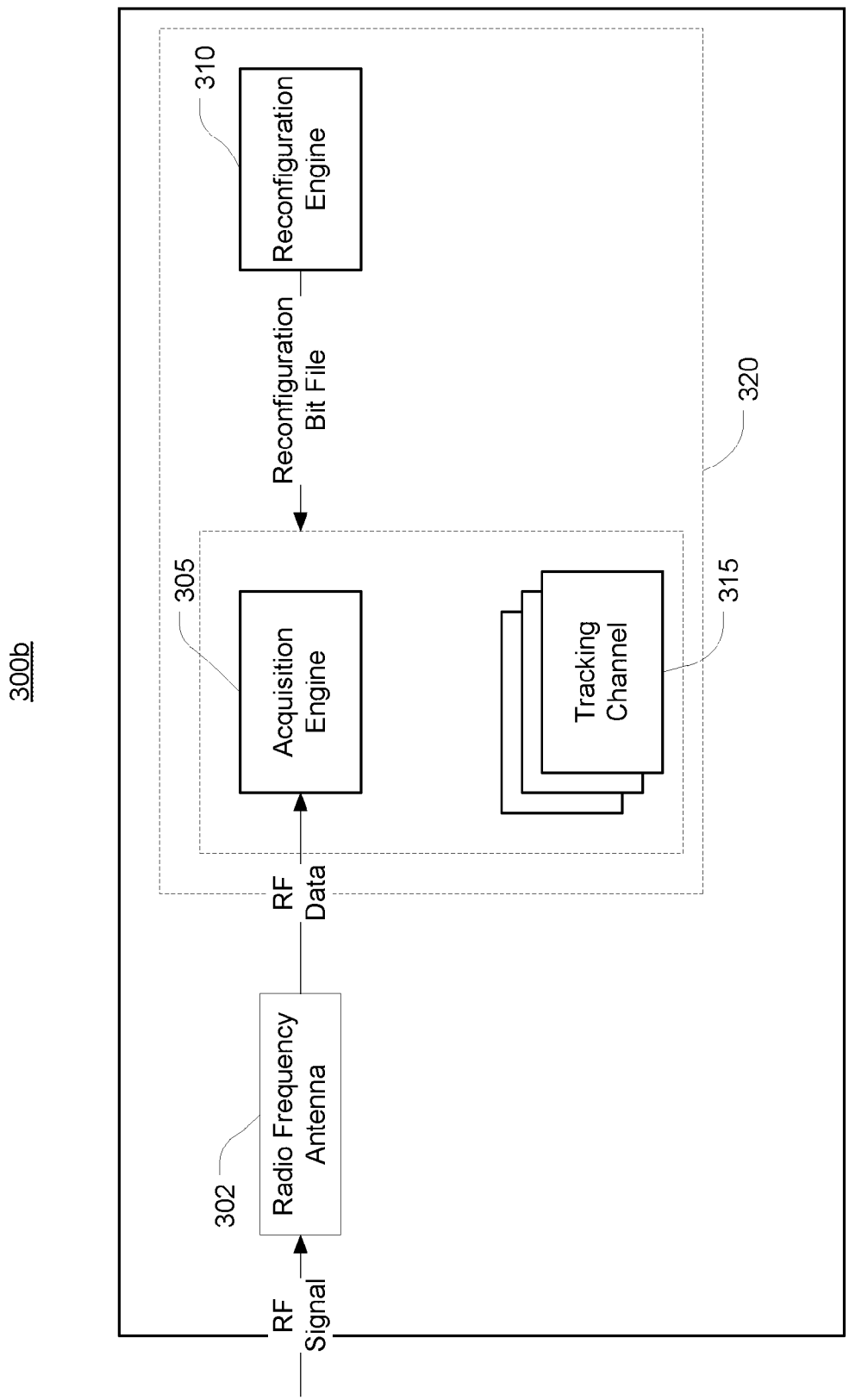
FIG. 3B is a block diagram of a receiver device for GNSS acquisition and tracking configured to execute FPGA self-partial reconfiguration according to the inventive concepts disclosed herein.

Referring now to FIG. 3B, a receiver device 300b is shown according to an exemplary embodiment of the inventive concepts disclosed herein. The receiver device 300b can be similar to the receiver device 300a, except that the receiver device 300b can be configured for self-partial reconfiguration of the FPGA 320. In some embodiments, the FPGA 320 includes the reconfiguration engine 310. For example, the FPGA 320 can include a static logic portion (e.g., logical elements which are not reset, rewritten, or reallocated by reconfiguration) which executes the reconfiguration engine 310. The reconfiguration engine 310 can generate a reconfiguration file (e.g., partial bit file) to cause partial reconfiguration of the FPGA 320, such as for reducing a circuit size used by the acquisition engine 305 or the tracking channels 315; the reconfiguration file may include instructions to reallocate logical elements used by the acquisition engine 305 but not by the reconfiguration engine 310.

Figure 4A:
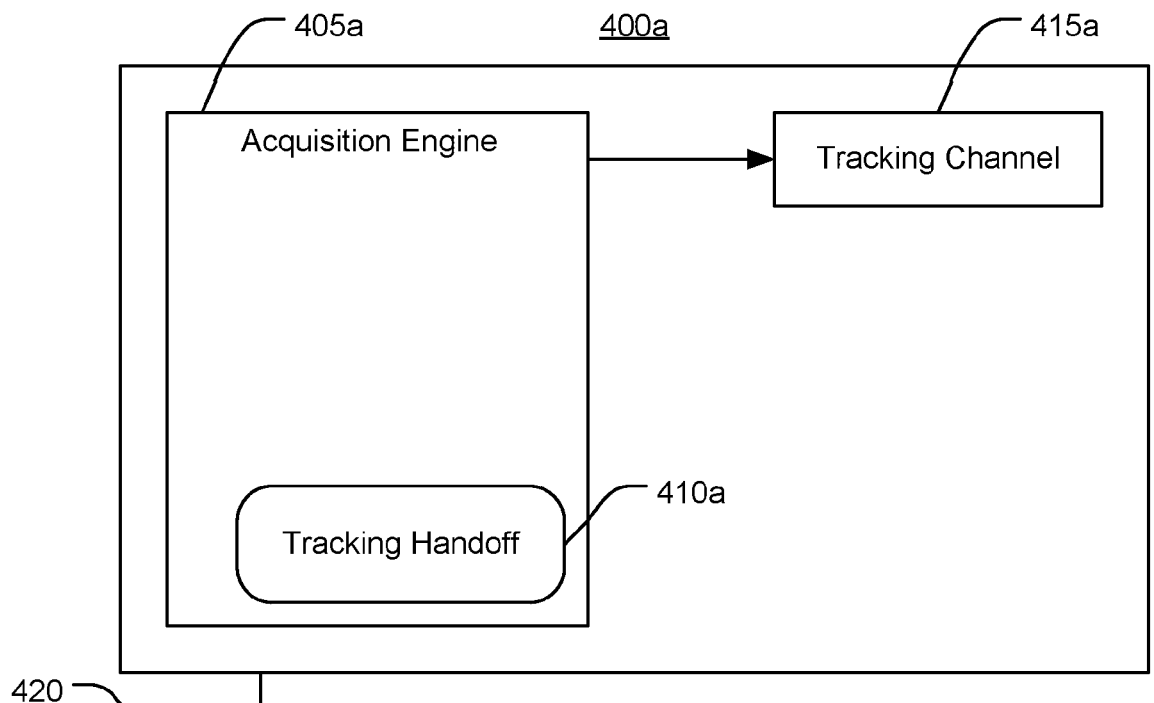
FIG. 4A is a schematic diagram of a receiver device for GNSS acquisition and tracking including an acquisition engine using a relatively large circuit size.
Figure 4B:
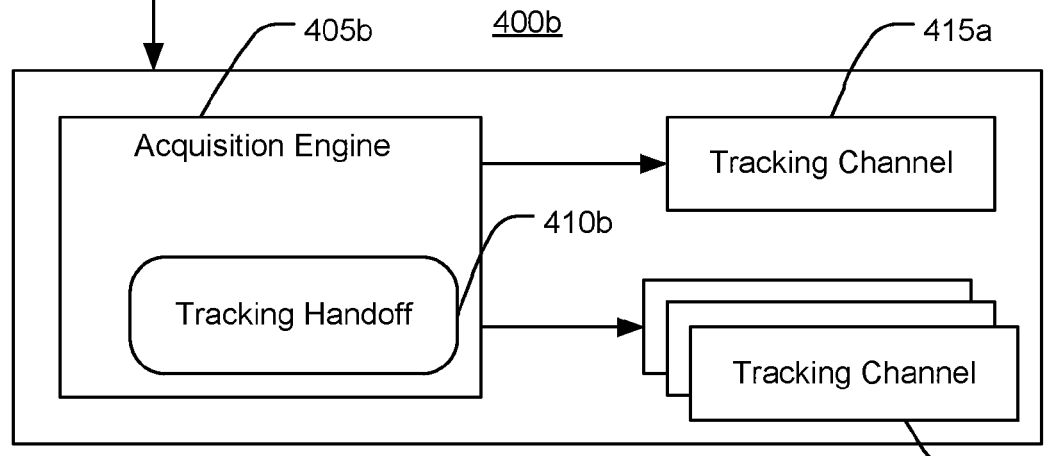
FIG. 4B is a schematic diagram of the receiver device of FIG. 4A having reconfigured the acquisition engine to use a relatively small circuit size.

Referring now to FIGS. 4A-4B, receiver devices 400a, 400b for acquisition and tracking of GNSS signals are shown according to exemplary embodiments of the inventive concepts disclosed herein. The receiver devices 400a, 400b can be similar to and incorporate features of the GNSS receiver 205, receiver device 300a, and/or receiver device 300b as described above.

Receiver device 400a includes an acquisition engine 405a using a first circuit size. The first circuit size can be associated with a first value of a time uncertainty parameter The acquisition engine 405a can acquire a first GNSS signal from a first satellite vehicle (e.g., satellite vehicle 110). Responsive to acquiring the first GNSS signal, the acquisition engine 405a can execute a first tracking handoff 410a to initiate (e.g., enable, activate) a first tracking channel 415a. Executing the first tracking handoff 410a may include transmitting data characteristic of the first satellite vehicle 110 to the first tracking channel 415a (e.g., distance, Doppler calculations, frequency, signal tracking codes).

In response to the acquisition engine 405a executing the first tracking handoff 410a (e.g., in response to detecting initiation of the first tracking channel 415a), the receiver device 400a can execute a partial reconfiguration 420 to a receiver device 400b. For example, a reconfiguration engine (not shown) associated with the receiver device 400a can generate a partial reconfiguration bit file configured to cause an FPGA implementing the acquisition engine 405a to use a second circuit size less than the first circuit size. The second circuit size can be determined based on a second value of a time uncertainty parameter associated with acquisition of a second satellite vehicle 110. The acquisition engine 405b can use the second circuit size to execute acquisition of a second GNSS signal from the second satellite vehicle 110. In response to acquiring the second GNSS signal, the acquisition engine 405b can execute a second tracking handoff 410b to initiate a second tracking channel 415b. The receiver device 400b can similarly execute reconfiguration for acquisition and tracking of additional satellite vehicles 110 (e.g., using additional tracking channels 415b). In some embodiments, the receiver devices 400a, 400b are configured to execute partial reconfiguration to initiate the tracking channels 415a, 415b (e.g., to allocate logical elements for executing of the tracking channels 415a, 415b).

Figure 5:
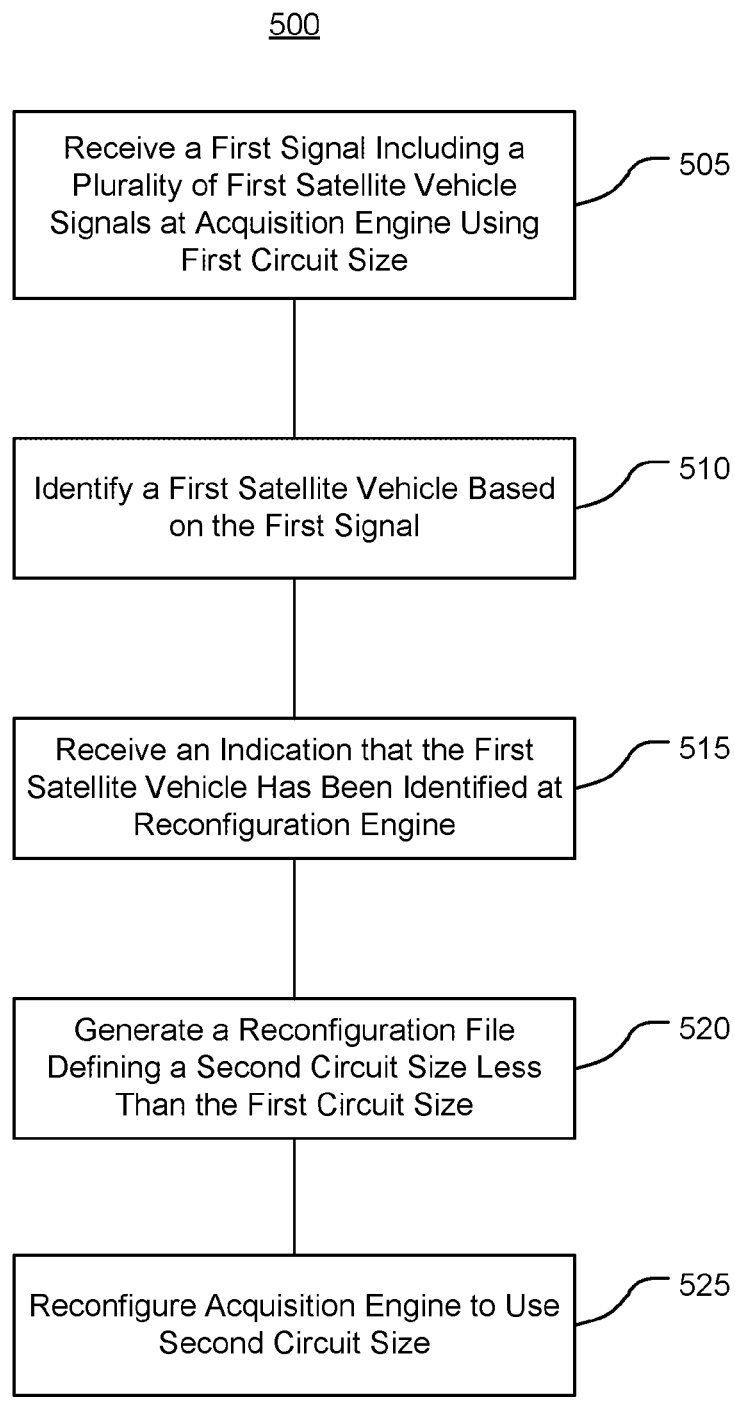
FIG. 5 is a diagram of an exemplary embodiment of a method for GNSS acquisition and tracking according to the inventive concepts disclosed herein.

Referring now to FIG. 5, an exemplary embodiment of a method 500 according to the inventive concepts disclosed herein may include the following steps. The method 500 may be executed using various hardware, apparatuses, and systems disclosed herein, such as one or more of the platforms of the communication network 100, the system 200, the receiver devices 300a, 300b, 400a, 400b, and/or components or features thereof.

A step (505) may include receiving a first signal including a plurality of first satellite vehicle signals at an acquisition engine. The acquisition engine can use a first circuit size, such as a first circuit size associated with logical elements of an FPGA. The first signal can be received from a radio frequency antenna which receives a radio frequency signal including a plurality of first satellite vehicle radio frequency signals and generates the first signal by encoding the radio frequency signal as an electrical or optical signal. The acquisition engine can also receive the first satellite vehicle radio frequency signals directly.

A step (510) may include identifying a first satellite vehicle based on the first signal. For example, the acquisition engine can execute acquisition of a first GNSS signal from the first satellite vehicle based on the first signal. The acquisition engine can execute acquisition by comparing a sample signal to the first signal to search for a signal match. In some embodiments, the acquisition of the first GNSS signal is associated with a first value of a time uncertainty parameter, which may correspond to a duration of time to be searched to execute the acquisition. The first circuit size may be associated with the first value of the time uncertainty parameter.

A step (515) may include receiving an indication that the first vehicle has been identified. For example, the acquisition engine can transmit an indication to a reconfiguration engine that the first GNSS signal from the first satellite vehicle has been acquired.

A step (520) may include generating a reconfiguration file defining a second circuit size less than the first circuit size. The second circuit size can be associated with a second value of the time uncertainty parameter, such that the computational resources used for executing the acquisition engine to acquire subsequent GNSS signals from other satellite vehicles is less than what was used for acquiring the first GNSS signal.

A step (525) may include reconfiguring the acquisition engine to use the second circuit size. For example, the acquisition engine may be implemented on an FPGA configured to execute partial reconfiguration based on the reconfiguration file. Reconfiguring the acquisition engine may include deallocating logical elements of the first circuit size which are not to be used as part of the second circuit size; the deallocated logical elements may be used to initiate and/or execute a first tracking channel for tracking the first satellite vehicle. In some embodiments, the method 500 includes reducing power usage by logical elements used with the first circuit size and not used with the second circuit size. In some embodiments, the method includes using the reconfigured acquisition engine to identify a second satellite vehicle (e.g., acquire a second GNSS signal from the second satellite vehicle), which may be tracked by a second tracking channel.

As will be appreciated from the above, systems and methods for scalable GNSS acquisition and tracking according to embodiments of the inventive concepts disclosed herein may improve operation of aircraft, other platforms, as well as by reducing size, weight, and or power requirements for satellite acquisition and tracking, improving GNSS receivers in both airborne platforms and portable electronic devices. Similarly, the inventive concepts disclosed herein can improve GNSS receiver technology by allocating computational resources to GNSS signal acquisition in a manner commensurate with the computational efforts required (e.g., a duration of time to be searched to execute the acquisition), enabling more predictable GNSS signal acquisition and thus more deterministic allocation of resources to acquisition, tracking, and other signal processing functions performed by the GNSS receiver.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A method, comprising:
    receiving, at an acquisition engine using a first circuit size, a first signal including a plurality of first satellite vehicle signals, wherein the acquisition engine is implemented using a field programmable gate array (FPGA);
    identifying, by the acquisition engine, a first satellite vehicle based on the first signal; receiving, at a reconfiguration engine, an indication that the acquisition engine identified the first vehicle;
    determining a duration of radio frequency data to be searched for acquiring global navigation satellite system (GNSS) signals for identifying a second satellite vehicle;
    generating, at the reconfiguration engine, responsive to receiving the indication, a reconfiguration file defining a second circuit size less than the first circuit size; wherein the second circuit size corresponds to a number of logical elements used by the acquisition engine and is determined based on the duration of radio frequency data to be searched for acquiring GNSS signals for identifying a second satellite vehicle; and
    reconfiguring the acquisition engine to use the second circuit size based on the reconfiguration file, wherein reconfiguring the acquisition engine includes executing FPGA partial reconfiguration based on the reconfiguration file, wherein executing FPGA partial reconfiguration includes deallocating logical elements of the first circuit size.

2. The method of claim 1, further comprising tracking the first satellite vehicle identified by the acquisition engine using a first tracking channel.

3. The method of claim 1, further comprising using, by the reconfigured acquisition engine, the second circuit size to receive a second radio frequency signal including a plurality of second satellite vehicle signals, and identifying a second satellite vehicle based on the second radio frequency signal.

4. The method of claim 3, further comprising tracking the second satellite vehicle identified by the reconfigured acquisition engine using a second tracking channel.

5. An airborne platform, comprising:
    a satellite receiver associated with an antenna configured to receive a first radio frequency signal including a plurality of first satellite vehicle signals and configured to generate a first data signal based on the first radio frequency signal, the satellite receiver including a field programmable gate array (FPGA) configured to:
        identify, by an acquisition engine of the FPGA, a first satellite vehicle based on the first data signal;
        determine a duration of radio frequency data to be searched for acquiring global navigation satellite system (GNSS) signals for identifying a second satellite vehicle;
        generate, responsive to identifying the first satellite vehicle, a reconfiguration file defining a second circuit size less than the first circuit size, wherein the second circuit size corresponds to a number of logical elements used by the acquisition engine, wherein the number of logical elements used by the acquisition engine is based on duration of radio frequency data to be searched for acquiring GNSS signals; and
        execute partial reconfiguration of the FPGA to reconfigure the acquisition engine to use the second circuit size based on the reconfiguration file, wherein executing FPGA partial reconfiguration includes deallocating logical elements of the first circuit size, wherein the satellite receiver is further configured to reduce a demand for electrical power subsequent to executing partial reconfiguration of the FPGA.

6. The airborne platform of claim 5, further comprising an aircraft power supply configured to provide electrical power to the satellite receiver.

7. The airborne platform of claim 5, wherein the satellite receiver includes a first tracking channel configured to track the first satellite vehicle identified by the acquisition engine.

8. The airborne platform of claim 5, wherein the first satellite vehicle is associated with the GNSS.

* * * * *